(12) United States Patent
Alix et al.

(10) Patent No.: US 7,048,899 B2
(45) Date of Patent: May 23, 2006

(54) REMOVING NOX, SO₂, AND HG FROM A GAS STREAM USING LIMESTONE REGENERATION

(75) Inventors: Francis R. Alix, Rye, NH (US); Joanna L. Duncan, Sanford, ME (US); Christopher R. McLarnon, Exeter, NH (US)

(73) Assignee: Powerspan Corp., Portsmouth, NH (US)

( * ) Notice: Subject to any disclaimer, the term of this patent is extended or adjusted under 35 U.S.C. 154(b) by 712 days.

(21) Appl. No.: 10/064,736

(22) Filed: Aug. 12, 2002

(65) Prior Publication Data

US 2003/0108466 A1 Jun. 12, 2003

Related U.S. Application Data

(63) Continuation-in-part of application No. 09/683,267, filed on Dec. 6, 2001, now Pat. No. 6,936,231.

(51) Int. Cl.
*B01D 53/60* (2006.01)

(52) U.S. Cl. .............. 423/235; 423/242.1; 423/243.06; 423/243.08; 423/243.11; 204/174; 204/177; 588/301; 588/320

(58) Field of Classification Search ................ 423/235, 423/242.1, 243.06, 243.08, 243.11; 204/174, 204/177; 588/301, 320
See application file for complete search history.

(56) References Cited

U.S. PATENT DOCUMENTS 3,873,532 A * 3/1975 Dahlstrom et al. .... 423/243.09
5,316,737 A * 5/1994 Skelley et al. .............. 422/170
6,136,284 A * 10/2000 Hwang et al. .............. 423/235
6,203,598 B1 * 3/2001 Hasegawa et al. ............. 95/92

FOREIGN PATENT DOCUMENTS

| WO | WO-99/47268 A1 | 9/1999 |
| WO | WO-01/87464 A1 | 11/2001 |
| WO | WO-02/062453 A1 | 8/2002 |

OTHER PUBLICATIONS

Lee, etal. "The Effect of In Situ Generated Ammonia—Sulfer Aerosols on the Removal of NOx in a Wet ESP", Aug. 20, 2001, Mega Symposium, Chicago, IL.

* cited by examiner

*Primary Examiner*—Stanley S. Silverman
*Assistant Examiner*—Peter J. Lish
(74) *Attorney, Agent, or Firm*—Phillip E. Decker; Mesmer & Deleault, PLLC

(57) ABSTRACT

A process and apparatus for removing $SO_2$, NO, and $NO_2$ from a gas stream having the steps of oxidizing a portion of the NO in the flue gas stream to $NO_2$, scrubbing the $SO_2$, NO, and $NO_2$ with an ammonia, ammonium hydroxide, alkali hydroxide or carbonate scrubbing solution, regenerating the scrubbing solution with limestone, and removing any particulate matter and aerosols generated by the scrubbing step in a wet electrostatic precipitator. The process can also remove Hg by oxidizing it to oxidized Hg and removing it in the wet electrostatic precipitator. The scrubbing solution is preferably regenerated with limestone or magnesium, and results in a Group II sulfite or sulfate that can be recovered and sold, or landfilled.

7 Claims, 1 Drawing Sheet

REMOVING NOX, SO₂, AND HG FROM A GAS STREAM USING LIMESTONE REGENERATION

CROSS REFERENCE TO RELATED APPLICATIONS

This is a continuation-in-part of U.S. application Ser. No. 09/683,267, filed Dec. 6, 2001 now U.S. Pat. No. 6,936,231.

BACKGROUND OF THE INVENTION a. Field of the Invention

This invention relates to methods and apparatuses for removing NOx, $SO_2$, and Hg from a gas stream.

b. Description of the Related Art

Fossil fuels are burned in many industrial processes. Electric power producers, for example, burn large quantities of coal, oil, and natural gas. Sulfur dioxide ("$SO_2$"), nitrogen oxide ("NO"), and nitrogen dioxide ("$NO_2$") are some of the unwanted byproducts of burning any type of fossil fuel. These byproducts are known to have serious negative health effects on people, animals, and plants, and a great deal of research has been done to find a way to economically remove them from flue gas streams before they enter the atmosphere.

$SO_2$ is often removed from gas streams ("desulfurization") by scrubbing the gas with an aqueous ammonium sulfate solution containing ammonia. Examples of this process are disclosed in U.S. Pat. Nos. 4,690,807, 5,362,458, 6,277,343, and 6,221,325, which are not admitted to be prior art by their mention in this Background section. The absorbed sulfur compounds react with ammonia to form ammonium sulfite and ammonium bisulfite, which are then oxidized to form ammonium sulfate and ammonium bisulfate. The ammonium bisulfate is further ammoniated to form ammonium sulfate. The process does not remove NO or $NO_2$, however, which must then be dealt with using a different process.

NO and $NO_2$ (together known as "NOx") can be removed from a gas stream by contacting the gas stream with either $ClO_2$ or $O_3$ to oxidize NO into $NO_2$, and then scrubbing with an aqueous solution of a sulfur-containing reducing compound of alkali metals or ammonia, and a catalytic compound. Such a process is disclosed in U.S. Pat. No. 4,029,739, by Senjo et al., which is not admitted to be prior art by its mention in this Background section. This process, however, does not remove $SO_2$, and requires the addition of chlorine or ozone into the system by some other means.

Some processes exist that remove both NOx and $SO_2$. In one such process disclosed in U.S. Pat. No. 4,035,470, by Senjo et al., which is not admitted to being prior art by its mention in this Background section, NO is oxidized to $NO_2$ by contacting the gas with either $ClO_2$ or $O_3$ as above. Then the $SO_2$ is scrubbed with a sulfite and an oxidation retardant that suppresses oxidation of the sulfite to sulfate. Iron or copper compounds can also be added to depress oxidation. Optionally, ammonium hydroxide can be added to make sulfite and to react with $CO_2$ in the gas stream to make carbonate. Like in U.S. Pat. No. 4,029,739 mentioned above, this process requires the addition of either chlorine or ozone, and further requires a consumable sulfite oxidation retardant. However, both U.S. Pat. Nos. 4,029,739 and 4,035,470 require the addition of chlorine to a gas stream that is eventually released to the atmosphere, creating a serious safety concern.

Yet another process for removing NOx and $SO_2$ from a gas stream is disclosed in U.S. Pat. No. 4,971,777, by Firnhaber et al., which is not admitted to be prior art by its inclusion in this Background section. In this process, NO is oxidized to $NO_2$ by the addition of organic compounds which decompose into radicals at high temperatures. Then an aqueous ammonia solution in which the pH is adjusted to be below 5.0 absorbs the NOx and $SO_2$. Scrubbing with ammonia produces a byproduct that may not be desirable in many industrial applications. Therefore, what is needed is a process that removes $SO_2$, NO, $NO_2$ and Hg from a gas stream that does not require the addition of a catalyst, chlorine, or ozone, and does not produce an ammoniated byproduct.

SUMMARY OF INVENTION

The present invention is directed to a process and apparatus that removes $SO_2$, NO, $NO_2$, and Hg from a gas stream that does not require the addition of a catalyst, chlorine, or ozone, and does not produce ammoniated byproduct. A process that satisfies these needs comprises the steps of oxidizing NO to $NO_2$ and Hg to oxidized Hg; scrubbing $SO_2$, NO, and $NO_2$ from the flue gas stream with an alkali or ammonium scrubber; regenerating the scrubbing solution with a Group II oxide, hydroxide or carbonate; and removing any oxidized Hg and aerosols with an aerosol remover. These and other features, aspects, and advantages of the present invention will become better understood with reference to the following description, drawing, and claims.

DETAILED DESCRIPTION

Figure 1:
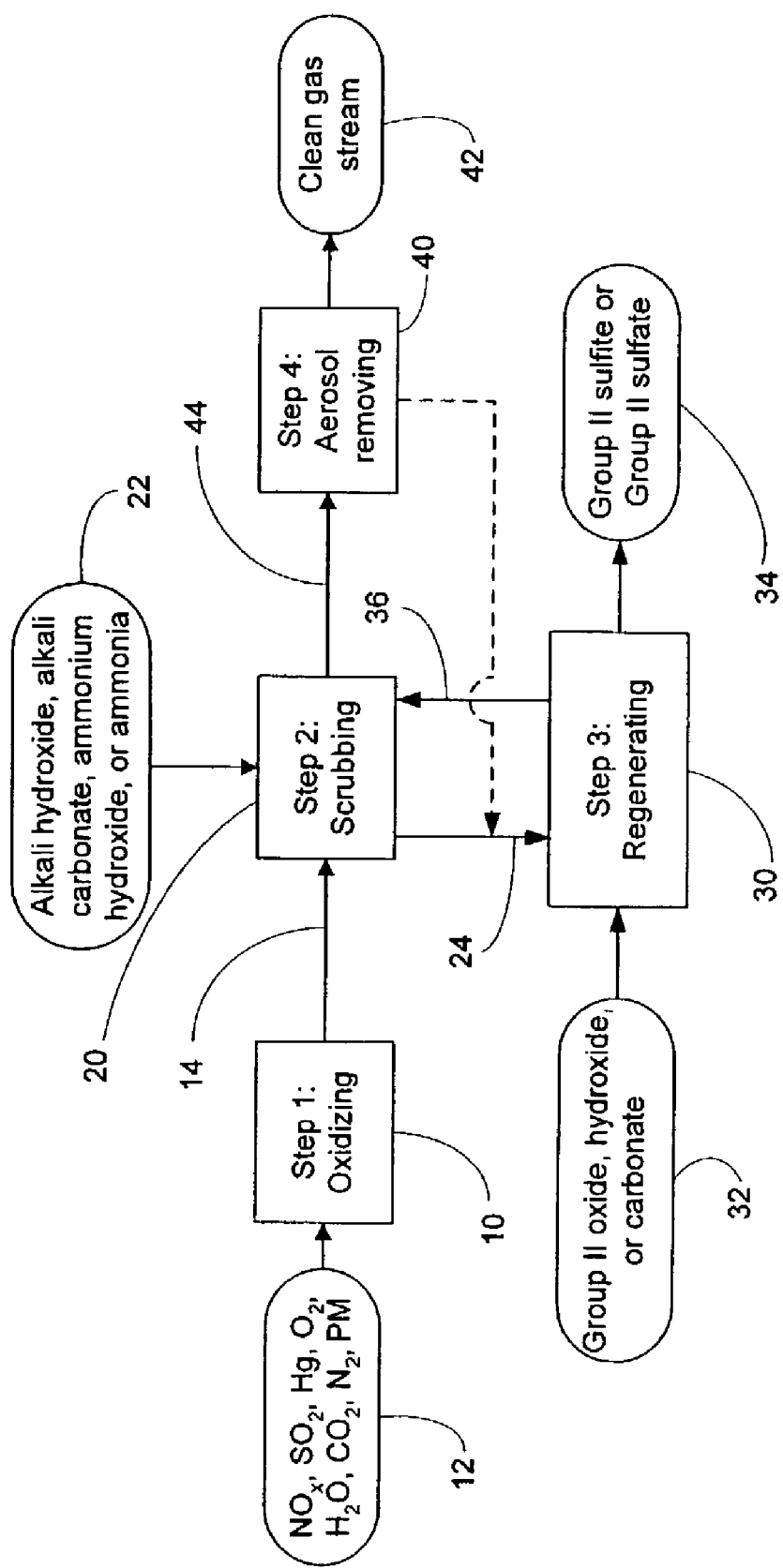
FIG. 1 is a process flow chart showing the process of the present invention.

The present invention is a process and apparatus for removing $SO_2$, NO, and $NO_2$ from a gas stream, especially from the flue gas stream of a fossil fuel boiler. In practice, flue gas from the combustion of fossil fuel nearly always contains more NO than $NO_2$, and often contains Hg, which can also be removed from the gas stream by this invention.

The inventors are familiar with methods and apparatuses for removing $SO_2$ and NOx from gas streams. U.S. Pat. Nos. 5,871,703, and 6,117,403 teach the use of an electrical discharge apparatus to oxidize $SO_2$ and NOx to form sulfuric and nitric acids respectively, collecting the acids in a wet electrostatic precipitator ("WESP") to form an effluent, and processing the effluent to make industrial grade acids that can be sold. The inventors on these two patents are Alix, Neister, and McLarnon, two of whom are inventors of the present invention. U.S. Pat. No. 6,132,692 teaches the use of a dielectric barrier discharge ("DBD") reactor to form the same acids, collecting them in a WESP, and draining them from the WESP to remove them from a gas stream. The inventors on this patent are Alix, Neister, McLarnon, and Boyle, two of whom are inventors of the present invention. The above three patents were owned by the owner of the present invention as of the filing date of this specification. They are hereby incorporated by reference as if completely rewritten herein.

The present invention comprises a process as shown in FIG. 1, and an apparatus designed to perform the process. A gas stream comprising NOx, $SO_2$, Hg, $O_2$, $H_2O$, $Co_2$, $N_2$, and particulate matter ("PM") 12 are present prior to the first step 10. These are the typical components of a flue gas stream from the combustion of fossil fuel. The first step 10 is oxidizing at least a portion of the NO in the flue gas to $NO_2$. The oxidizing step 10 is done with an oxidizer of some sort. The oxidizer selected should be able to oxidize greater than about two percent of the NO to $NO_2$, and is preferably in the region of about ninety percent. If the user desires to remove Hg, the oxidizer should also be adapted to oxidize Hg to oxidized Hg. As used in this specification, examples of oxidized Hg include, but are not limited to, HgO and Hg++.

The oxidizing step 10 should be adjusted so that the resulting mole ratio of $SO_2$ to $NO_2$ after the oxidizing step should be at least 2 to 1. The ratio is preferably four to one, but can be greater. The oxidizer can be any means known in the art, including but not limited to, using an electrical discharge reactor, and injecting $ClO_2$, $O_3$ or certain organic compounds. For example, U.S. Pat. Nos. 4,029,739 and 4,035,470 teach converting NO to $NO_2$ by the addition of $ClO_2$ or $O_3$ into the gas stream. U.S. Pat. No. 4,971,777 teaches the addition of certain organic compounds that decompose into radicals at high temperatures.

Examples of suitable electrical discharge reactors include corona, pulsed corona, e-beam, and DBD reactors. DBD is synonymously referred to as silent discharge and non-thermal plasma discharge. It is not the same as corona discharge or pulsed corona discharge. The preferred embodiment uses a DBD reactor, such as that disclosed in U.S. Pat. No. 6,132,692, by Alix, et al. In practice, the operator of the process will adjust the power input to the reactor to attain the desired oxidation results as a function of the cost of power input to the reactor, desired scrubbing results, and other factors. Laboratory testing has shown that oxidation of at least 90% of the NO and 80% of the Hg is readily attainable with the present invention.

As taught in U.S. Pat. No. 6,132,692, a DBD reactor will oxidize at least a portion of the NO and $NO_2$ in a gas stream to nitric acid, and at least a portion of the $SO_2$ in a gas stream to sulfuric acid. These acids are dealt with in the next step of the process.

If an oxidizer other than an electrical discharge reactor is used, Hg may or may not be oxidized to oxidized Hg. On the other hand, it is possible, and perhaps desirable, that some of the NO and $NO_2$ becomes further oxidized to form $HNO_3$ regardless of the means used. The reason why this may be desirable will be made clear later in this specification.

Another oxidizing method 10 is adding an alkene, such as ethylene or propylene, to the gas stream followed by oxidizing NO to $NO_2$ in an electrical discharge reactor. This would have the advantage of reducing the power input requirement of the electrical discharge reactor to get the same amount of NO to $NO_2$ oxidation. However, an operator of the method must use caution not to use an amount of alkene in excess of that required for oxidation, since unused alkene will be emitted from the stack as hydrocarbon slip. The alkene can be added in about a 0.5:1 molar ratio of alkene to NO. The chemical reaction mechanisms for the use of one alkene—ethylene—to convert NO to $NO_2$ in an electrical discharge reactor are likely to be as follows:

  (1)

  (2)

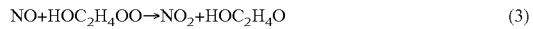  (3)

  (4)

  (5)

In any event, the output gas stream 14 comprises $N_2$, $O_2$, $CO_2$, $H_2O$, less NO, more $NO_2$, $SO_2$, perhaps $HNO_3$, perhaps $H_2SO_4$, and perhaps HgO (one form of oxidized Hg).

The second step 20 is scrubbing at least a portion of the $SO_2$, NO, and $NO_2$ present in the gas stream. The term "scrubbing" typically means "absorbing" to people having skill in the art, meaning that $SO_2$, NO, and $NO_2$ is absorbed by the aqueous solution. However, it is intended that the term "scrubbing" as used in this specification also includes adding an alkali hydroxide, an alkali carbonate, ammonium hydroxide, or ammonia 22 to convert $SO_2$ and NOx to the corresponding sulfate, sulfite, bisulfate, and bisulfite 24. The alkali materials used in the preferred embodiment are sodium, potassium, or ammonia or the previously mentioned in any combination. Any alkali capable of raising the pH of the scrubbing solution may be used, although sodium and/or potassium and/or ammonia and are preferred. The second step 20 also cools the gas stream to facilitate the necessary reactions.

The solution preferably has a pH above six, which is much higher than that taught by Firnhaber. Firnhaber teaches that the pH must be kept to less than five, and is preferably 4.5, to prevent the formation of aerosols. However, the present invention is not concerned with avoiding the formation of aerosols because it includes an aerosol remover 40, described later in this specification.

Maintaining a relatively high pH has several benefits. It increases the speed of absorption of $SO_2$. It increases the ratio of sulfite available in solution compared to bisulfite, which facilitates the oxidation of $SO_2$ and reduction of $NO_2$. The ratio of sulfite to bisulfite is highly dependent on pH level. From these benefits, it follows that the scrubber absorption vessel required can be substantially smaller than that used to scrub the same amount of $SO_2$ at a pH below 5.

The sulfite and bisulfite react with the NO and $NO_2$ to form sulfate. Most of the $HNO_3$ that may have been formed by further oxidation of NO and $NO_2$, and/or created by a DBD reactor, will be neutralized to form an alkali or ammonium nitrate.

In a similar way, most of the sulfuric acid created by the DBD reactor will react with the solution and form an alkali/ammonium sulfate or bisulfate. As one can see from the above description, the process removes $SO_2$, NO, and $NO_2$ from the gas stream, and produces nitrates and sulfates. Molecular nitrogen may also be a reaction product.

As the scrubber becomes loaded with reaction products, the scrubbing solution must be regenerated 30 to retain its effectiveness. The scrubbing solution is regenerated by the addition of at least one oxide, hydroxide, or carbonate 32 of a cation selected from Group II of the Periodic Table, for example, calcium or magnesium. The preferred regenerator material is calcium carbonate, which is limestone, because it is abundant and inexpensive. The addition of the Group II oxide, hydroxide, or carbonate causes a Group II sulfite or sulfate 34 to precipitate out of solution. It can then be removed from the regenerator. The liquid output of the regeneration step 30 is an alkali hydroxide and/or alkali bisulfite 36. The gas stream 44 after the scrubbing step 20 comprises alkali sulfate, nitrate, and sulfite aerosols, and possibly sulfuric acid and nitric acid. It also comprises $N_2$, $O_2$, $CO_2$, $H_2O$, and oxidized Hg. This process of absorbing $SO_2$ with a scrubbing solution, regenerating the scrubbing solution, and removing a sulfate or sulfite, is generally known as the dual alkali process.

The fourth step 40 is removing at least a portion of the aerosols and the oxidized Hg, if present, and PM, from the gas stream. A wet electrostatic precipitator ("WESP") is the preferred aerosol remover. A mist eliminator can be used separately or together with the WESP. A WESP, however, is very effective at collecting aerosols, oxidized Hg, and any other particles that may be present in the gas stream. The removed aerosols, if a WESP is used, are sent to the regeneration step 30 for treatment. This loop applies only if a WESP is used, which is why the loop is shown as a dotted line in FIG. 1.

As a result of this process, $SO_2$, NO, $NO_2$, and Hg are removed from a gas stream, and the waste products can be landfilled. The output of the aerosol removal step 40 is a clean gas stream 42, substantially free of these harmful substances.

The four-step process and apparatus described herein was designed specifically to treat flue gas from a coal fired power plant. However, it can be appreciated that the invention is capable of operating on any gas stream in which NOx and $SO_2$ are present, including but not limited to gas and oil-fired boilers and various chemical manufacturing processes. The NOx and $SO_2$ concentrations and operating conditions will be different in each situation. Therefore, it is understood that an operator or system designer will be motivated to modify the scrubbing step 20 to possibly eliminate the need for either one or both the oxidizing step 10 or the aerosol removal step 40, or combine the four steps somehow so that fewer than four are needed.

It will be apparent to those skilled in the art that various changes and modifications can be made without departing from the spirit of the present invention. Accordingly, it is intended to encompass within the appended claims all such changes and modifications that fall within the scope of the present invention.

This invention claimed is:

1. A process for removing $SO_2$, NO, and $NO_2$ from a gas stream comprising the steps of
    a. oxidizing at least a portion of the NO in a gas stream to $NO_2$ with a dielectric barrier discharge reactor, and
    b. scrubbing at least a portion of $SO_2$, NO, and $NO_2$ from the gas stream with a dual alkali scrubber.

2. The process of claim 1, said scrubbing step having a scrubbing solution comprising at least one taken from the group consisting of alkali hydroxide, alkali carbonate, ammonia, and ammonium hydroxide.

3. The process of claim 1, further comprising the step of regenerating the scrubbing solution with a Group II oxide, a Group II hydroxide, or a Group II carbonate.

4. A process for removing $SO_2$, NO, and $NO_2$ from a gas stream comprising the steps of
    a. oxidizing at least a portion of NO in a gas stream to $NO_2$ with a dielectric barrier discharge reactor, followed by
    b. scrubbing at least a portion of $SO_2$ NO, and $NO_2$ from the gas stream with a scrubbing solution comprising an alkali hydroxide or an alkali carbonate, followed by
    c. regenerating the scrubbing solution with a Group II oxide, a Group II hdroxide or a Group II carbonate, and
    d, removing at least a portion of any aerosols generated from the scrubbing step from the gas stream with an aerosol remover.

5. The process of claim 4, further comprising the step of oxidizing at least a portion of the NO to $HNO_3$ with said dielectric barrier discharge reactor.

6. A process for removing $SO_2$ NO, $NO_2$, and Hg from a gas stream comprising the steps of
    a. oxidizing at feast a portion of NO in a gas stream to $NO_2$ and Hg to oxidized Hg with dielectric barrier discharge reactor, followed by
    b. scrubbing at least a portion of $SO_2$, NO, and $NO_2$ from the gas stream with a scrubbing solution comprising at least one taken from the group consisting of alkali hydroxide, alkali carbonate, ammonia, and ammonium hydroxide, followed by
    c. regenerating the scrubbing solution with a Group II oxide, a Group II hydroxide, or a Group II carbonate, and
    d. removing at least a portion of the oxidized Hg and any aerosols generated from the scrubbing step from the gas stream with an aerosol remover.

7. The process of claim 6, further comprising the step of oxidizing at least a portion of the NO to $HNO_3$ with said dielectric barrier discharge reactor.

* * * * *